G. J. CAPEWELL.
Lamp Burner.
No. 59,554.
Patented Nov. 13, 1866.
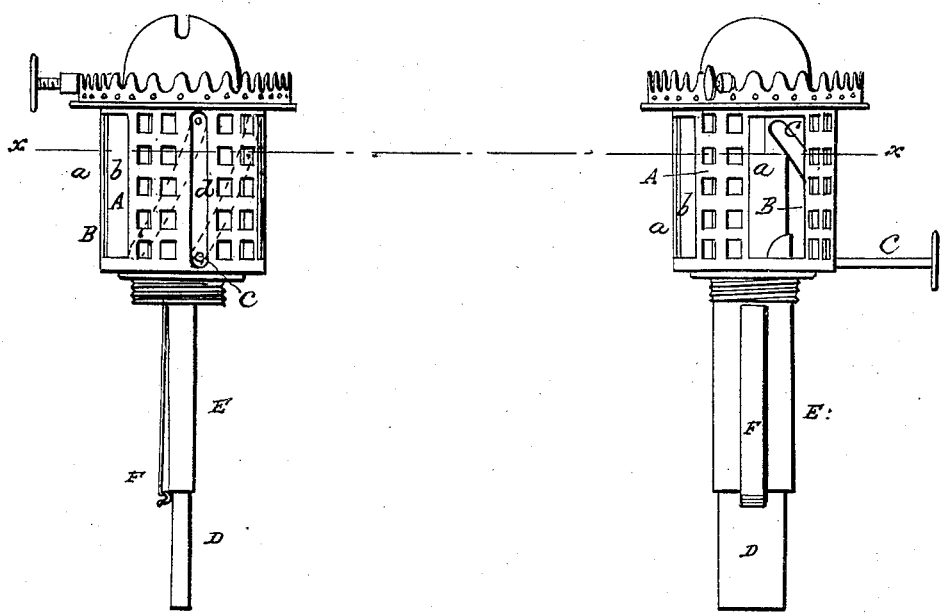
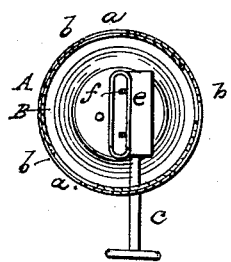
WITNESSES:
Alex T. Roberts
J. M. Covington
INVENTOR.
Geo. J. Capewell.

UNITED STATES PATENT OFFICE.

GEORGE J. CAPEWELL, OF WEST CHESHIRE, CONNECTICUT.

IMPROVEMENT IN LAMP-BURNERS.

Specification forming part of Letters Patent No. 59,554, dated November 13, 1866.

*To all whom it may concern:*

Be it known that I, GEORGE J. CAPEWELL, of West Cheshire, in the county of New Haven and State of Connecticut, have invented a new and useful Improvement in Lamp-Burners; and I do hereby declare that the following is a full, clear, and exact description thereof, which will enable others skilled in the art to make and use the same, reference being had to the accompanying drawings, forming part of this specification, in which—

Figures 1 and 2 are external views of my invention; Fig. 3, a horizontal section of the same, taken in the line of $x\,x$, Figs. 1 and 2.

Similar letters of reference indicate corresponding parts.

This invention relates to that class of lamp-burners which are provided with draft-chimneys; and has for its object the lighting of the wick without the necessity of removing the chimney from the burner, and at the same time have the wick-tube, when the lamp is lighted and in use, in a proper relative position with the cone or deflector, so that a proper illuminating-flame will be obtained.

Lamp-burners hitherto constructed with a view to this end have been attended with the objection of a low wick-tube, in order to facilitate the lighting of the wick by the insertion of a match within the burner, and the wick cannot be lighted without great difficulty unless the top of the wick-tube be too far below the cone or deflector to admit of a perfect flame being produced.

My invention consists in obviating this difficulty by having the wick-tube arranged so that it may be raised and lowered—lowered when it is desired to light the wick, and raised after being lighted—so that the upper end of the wick-tube may have a proper relative position with the cone or deflector; and the invention further consists in connecting the doors in the side of the burner with the wick-adjusting rod in such a manner that the doors may be opened and closed simultaneously with the lowering and raising of the wick-tube.

A represents the side of the lamp-burner, constructed of sheet metal, and perforated or provided with openings to admit air to the flame. The side A also has a series of large openings, $a$, made in it at equal distances apart, and extending the whole height of the side, and within the burner there is fitted a sheet-metal cylinder, B, which has openings $b\,b$ made in it, corresponding to the openings $a$ in the side A, with perforated spaces between.

The cylinder B is allowed to turn freely within A, and it has an oblique or spiral slot, $c$, made in it, through which a rod, C, passes horizontally, said rod also passing through a vertical slot, $d$, in the side A of the burner, and through a box, $e$, attached to the wick-tube D. This rod C has the usual serrated wheels, $f$, secured upon it, to act upon the wick and raise and lower it within the tube D.

The wick-tube D is not fixed within the burner, but is allowed to slide freely up and down therein, and is fitted within a guide-tube, E, which extends down from the bottom of the burner, and has a spring, F, attached to its exterior, the lower end of which bears against the exterior of the wick-tube just below the guide-tube, and prevents the wick-tube from casually moving. (See Figs. 1 and 2.)

From the above description it will be seen that by raising and lowering the rod C the wick-tube D will be raised and lowered, as D is attached to C, and in consequence of the rod C passing through the oblique slot $c$ the inner cylinder, B, will be turned simultaneously with the raising and lowering of the wick-tube, turned so that its openings $b$ will register with the openings $a$ in the side A of the burner when the wick-tube is down, and the openings $a$ in A closed when the wick-tube is raised.

Thus the wick may be readily lighted when lowered, and the doors in the side A of the burner opened and closed simultaneously with the raising and lowering of the wick-tube.

Having thus described my invention, I claim as new and desire to secure by Letters Patent—

1. The combination of the slot $a$, door $b$, (one or more,) with the ratchet-shaft C, wick D, burner A, and cylinder B, substantially as described, for the purpose specified.

2. The spring F, for holding the wick-tube D, when arranged so that its lower end catches under the lower end of the tube when the tube is raised to its highest point, substantially as and for the purpose specified.

The above specification of my invention signed by me this 13th day of April, 1866.

G. J. CAPEWELL.

Witnesses:
M. M. LIVINGSTON,
ALEX. F. ROBERTS.